Nov. 19, 1929.　　　H. EMBREE　　　1,736,492
STOVE PIPE
Filed Jan. 12, 1929
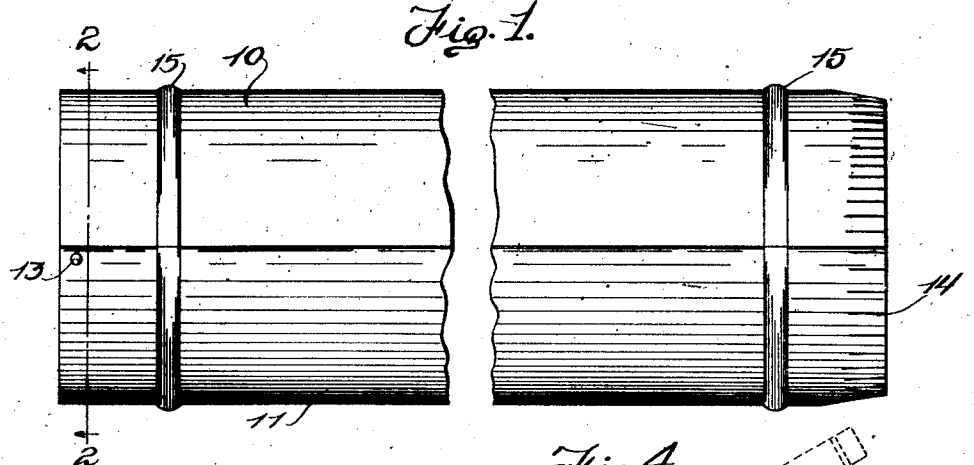
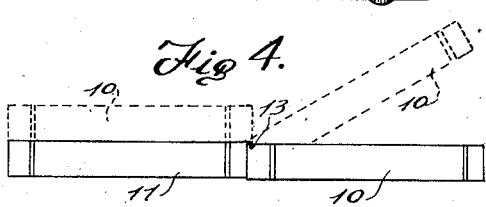
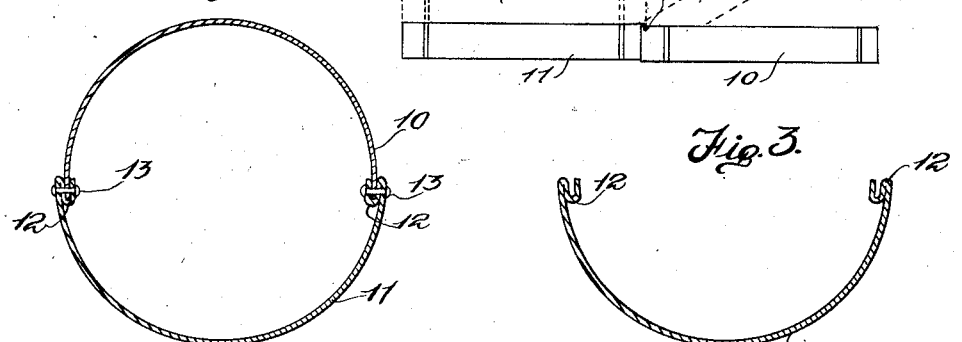
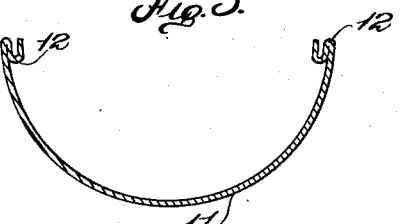
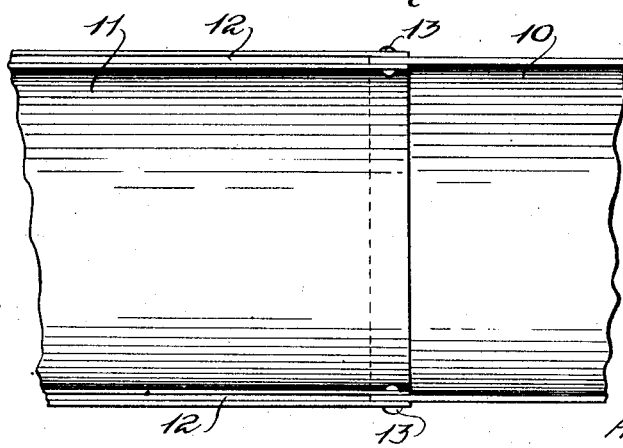
INVENTOR.
HERBERT EMBREE
BY
ATTORNEY Patented Nov. 19, 1929

1,736,492

UNITED STATES PATENT OFFICE

HERBERT EMBREE, OF HAMILTON, ONTARIO, CANADA

STOVE PIPE

Application filed January 12, 1929. Serial No. 332,097.

This invention relates to sheet metal pipes and has special reference to a stove pipe.

It is a well understood fact that stove and furnace pipes are manufactured in short lengths at the factory, shipped to the point of use and are erected by slipping the end of one pipe into the mating end of the next joint or pipe. These joints are made up in tubular form and, while light, are very bulky so that the shipment of any large quantity of such pipe joints requires very considerable space.

The principal objects of the present invention are to provide an improved form of pipe joint wherein the joint is made in the factory in such manner that a series of joints, all of the same size, may be closely nested in such manner as to take up but a small amount of space compared to the space taken up by tubular joints; to provide a joint split longitudinally so that when separated each half is semi-circular in cross-section thus enabling separate joints to be packed one within the other; to hinge the two pieces of each joint in such manner that they can be readily brought to tubular form by a simple folding movement; to provide a closely fitting seam along the junction of the two parts of each joint; and to provide a joint of this split and folding character so arranged that when connected to another joint it will be prevented from unfolding or opening.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of the improved pipe joint.

Figure 2 is a section on the line 2—2 of Figure 1.

Figure 3 is a section of one-half of the joint showing the channels for receiving the other half of said joint.

Figure 4 is a reduced view showing the two halves of the joint open ready for nesting, other positions of the parts being shown in dotted lines.

Figure 5 is a plan view of the joint at the hinge portion thereof.

In carrying out the objects of this invention the pipe joint is made in two complementary halves. One of these halves is of plain arcuate form in cross-section, the arc being slightly more than a semi-circle as shown at 10. The corresponding half is also arcuate in cross-section as at 11, for a little more than a semi-circle but this half has its edges folded inwardly and then rebent to provide longitudinal channels 12 wherein the edges of the part 10 fit when the joint is swung to tubular form. At one end rivets 13 pass through edge portions of the part 10 and the channeled edges of the part 11, this being the larger or female end of the joint. The two parts at the remaining end of the joint are crimped as at 14 so that when the two parts are swung to the position shown in Figure 1 the crimped end of one joint may be inserted in the mating end of the other joint and when thus inserted the parts cannot be swung to the open or shipping position shown in Figures 4 and 5. Preferably each of these parts is provided with beading 15 to stiffen the joint sections and prevent their distortion under storage.

When the joints are to be stored or shipped they are opened as in Figure 4 and one nested inside of the other. When they are to be assembled they are folded as in Figure 1 and assembled in the usual manner.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A stove and furnace pipe joint consisting of two cooperating substantially semicircular trough like sections having interfitting longitudinal edges, said sections being hinged together adjacent their longitudinal edges.

2. A stove and furnace pipe joint consisting of two cooperating substantially semicircular trough like sections having interfitting longitudinal edges, said sections being hinged together adjacent their longitudinal edges, the free ends of said sections being tapered to fit within the hinged end of an adjacent joint.

3. A stove and furnace pipe joint consisting of two substantially semi-circular trough like sections, one section having its longitudinal edges provded with channels and the edges of the other section fitting closely in said channels, and pivots connecting said sections at one end near the longitudinal edges.

4. A stove and furnace pipe joint consisting of two substantially semi-circular trough like sections, one section having its longitudinal edges provided with channels and the edges of the other section fitting closely in said channels, and pivots connecting said sections at one end near the longitudinal edges, the free ends of said sections being tapered to fit within the hinged end of an adjacent joint.

In testimony whereof I have affixed my signature.

HERBERT EMBREE.